J. T. RUST.
Churn.
No. 56,103.
Patented July 3, 1866.
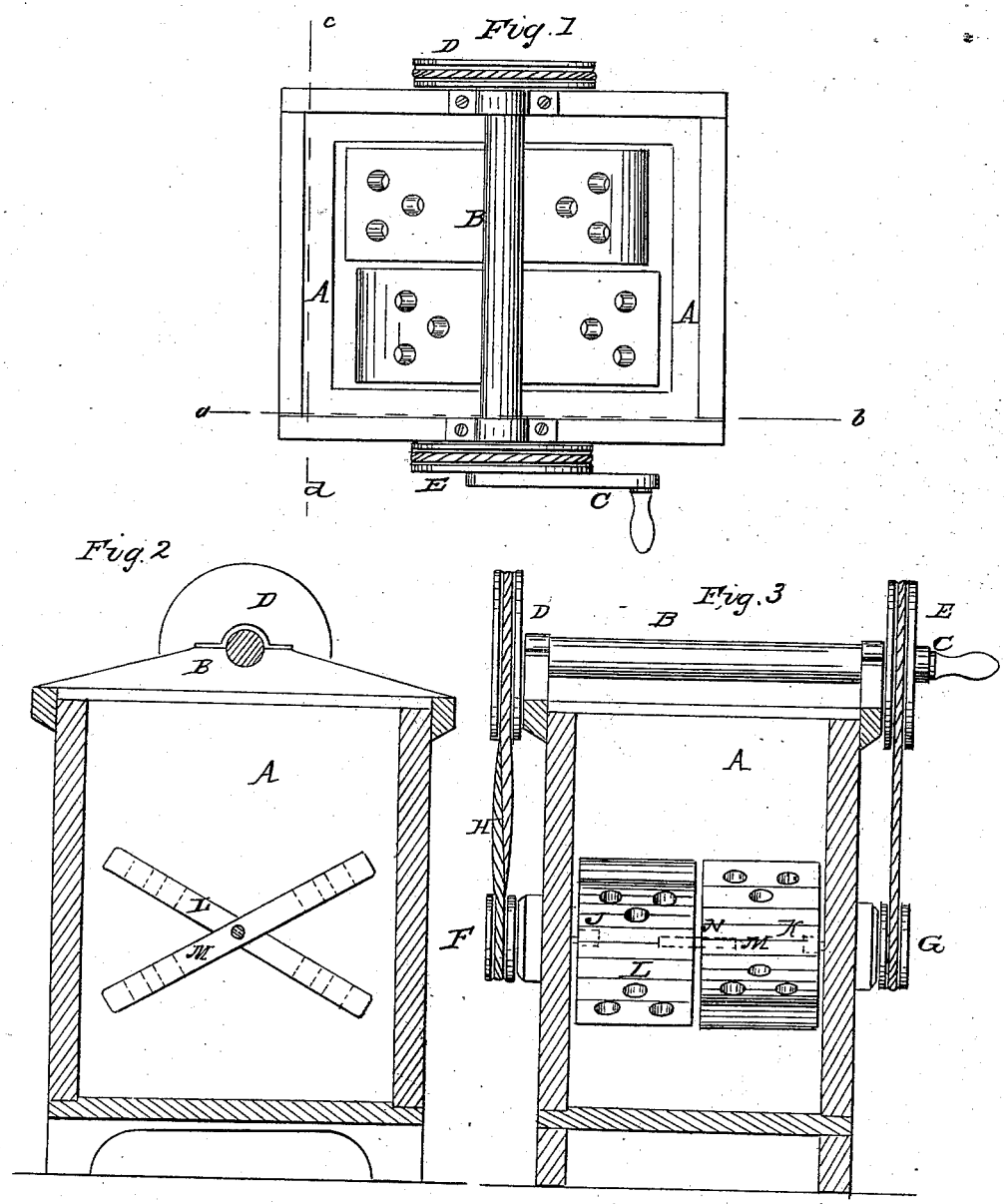

UNITED STATES PATENT OFFICE.

JACOB L. RUST, OF OQUAWKA JUNCTION, ILLINOIS.

IMPROVEMENT IN CHURNS.

Specification forming part of Letters Patent No. 56,103, dated July 3, 1866.

*To all whom it may concern:*

Be it known that I, JACOB L. RUST, of Oquawka Junction, Henderson county, State of Illinois, have invented a new and useful Improvement in Churns; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which—

Figure 1 is a top view of the machine with the lid removed. Fig. 2 is a vertical section on the line $a\ b$, Fig. 1. Fig. 3 is a vertical section on the line $c\ d$, Fig. 2.

My invention consists of a churn in which two perforated dashers are revolved in opposite directions upon the same horizontal shaft. By this means a particularly effective action is produced upon the cream or milk.

In the drawings, A represents the body of the churn; B, a shaft, on which is a hand-crank, C, which rotates the two wheels D E. Cords from the latter rotate the wheels F G. The cord H, being crossed, rotates the wheel F in one direction, while the wheel G, being rotated by the uncrossed cord I, runs in a contrary direction to the wheel F.

The wheels F G are attached to the shafts J K, which carry the perforated dashers L M, which revolve in parallel vertical planes, but in opposite directions and at the same velocities.

Instead of cords, gear-wheels may be used to convey the motion of the shaft B to the shafts J K, two wheels being interposed between the shaft B and the shaft K and but one between the shaft B and the shaft J, so that the shafts J K may be rotated in opposite directions, as stated before when speaking of the crossed and uncrossed cords H and L. The dasher-shaft has a loose dowel axial pin, N, which preserves the axes in line with each other.

Having described my invention, what I claim therein as new, and desire to secure by Letters Patent, is—

Constructing, arranging, and operating the dashers L M in the manner and for the purposes herein specified.

JACOB L. RUST.

Witnesses:
FRANCIS C. ESSEX,
JOSEPH F. LYON.